US005758198A

United States Patent [19]
Watkins et al.

[11] Patent Number: 5,758,198
[45] Date of Patent: May 26, 1998

[54] APPARATUS AND METHODS FOR LOADING A SINGLE-USE CAMERA AND SINGLE-USE CAMERA LOADABLE THEREBY

[75] Inventors: Joseph A. Watkins, Rochester; Duane B. Kirk, Hilton, both of N.Y.

[73] Assignee: Eastman Kodak Company, Rochester, N.Y.

[21] Appl. No.: 841,438

[22] Filed: Apr. 22, 1997

[51] Int. Cl.$^6$ .............................. G03B 17/02; G03B 1/02
[52] U.S. Cl. ............................ 396/6; 396/411; 396/538
[58] Field of Search ................................ 396/6, 411, 387, 396/429, 535, 538; 242/530.2, 533; 29/430

[56] References Cited

U.S. PATENT DOCUMENTS

| | | |
|---|---|---|
| 3,347,142 | 10/1967 | Steisslinger . |
| 3,930,296 | 1/1976 | Hoover . |
| 4,100,667 | 7/1978 | Napor et al. . |
| 4,228,579 | 10/1980 | Dunkel et al. . |
| 4,884,087 | 11/1989 | Mochida et al. . |
| 4,890,130 | 12/1989 | Takei et al. . |
| 4,947,536 | 8/1990 | Suzuki et al. . |
| 5,311,231 | 5/1994 | Suzuki et al. . |
| 5,610,679 | 3/1997 | Sugano et al. ................. 396/538 |
| 5,630,178 | 5/1997 | Zander et al. .................... 396/6 |

FOREIGN PATENT DOCUMENTS

| | | | |
|---|---|---|---|
| 0632314 A3 | 5/1994 | European Pat. Off. .......... G03C 3/00 |
| 0 743 546 A1 | 11/1996 | European Pat. Off. . |
| 4-226439 | 4/1991 | Japan ............................. G03B 17/00 |
| 6-130568 | 5/1994 | Japan ............................. G03C 3/00 |
| 7-219156 | 8/1995 | Japan ............................. G03C 3/00 |

*Primary Examiner*—A. A. Mathews
*Attorney, Agent, or Firm*—Charles E. Snee, III; Gordon M. Stewart

[57] ABSTRACT

Apparatus (10) is disclosed for loading a camera frame (110) for subsequent inclusion in a single-use camera, the camera frame including an exposure opening (112), a first receiver (114) on one side of the exposure opening for a light-tight film cartridge (18) enclosing a spool (20) to which is attached a trailing end of a filmstrip (44), a second receiver (118) on an opposite side of the exposure opening for a scroll (234) formed from the filmstrip, the second receiver having a longitudinal axis (126), at least one open end (120), and a wall (124) extended at least partially around the axis, the apparatus including a nest (32) for holding a cartridge; a mechanism (36–42; 356) for moving a leading end (46; 354) of a filmstrip from a cartridge; a scroll retainer (92; 278, 290) including at least one abutment (94, 96; 280, 282, 286; 292, 296, 304, 308) for engaging an external surface of a scroll to prevent clock-springing; a mechanism (72) for positioning the scroll retainer near a scrolling quill; a scrolling guide (64) for engaging a leading end around a scrolling quill; a rotatable scrolling quill (58) to wind a scroll; a mechanism (50–54, 62) for removing the scrolling quill from a scroll and leaving a scroll engaged with the scroll retainer; a tool (140), operable after removal of the scrolling quill from a scroll, for installing a cartridge into the first receiver, and a scroll and the scroll retainer into the second receiver, whereby a portion of a filmstrip will extend across the exposure opening between a cartridge and a scroll; and a mechanism (88, 160, 274) for removing the scroll retainer axially from the second receiver through the at least one open end.

43 Claims, 10 Drawing Sheets

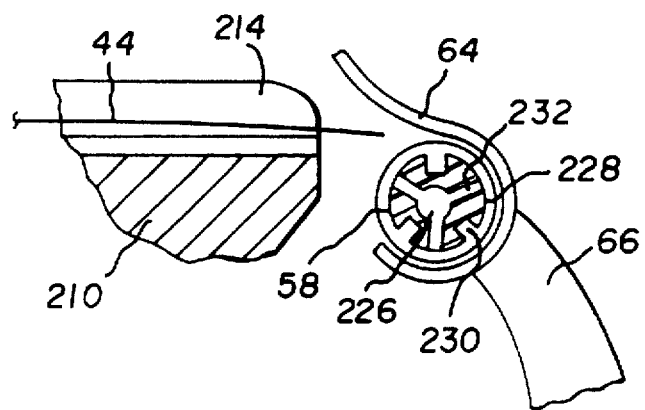
FIG. 5A
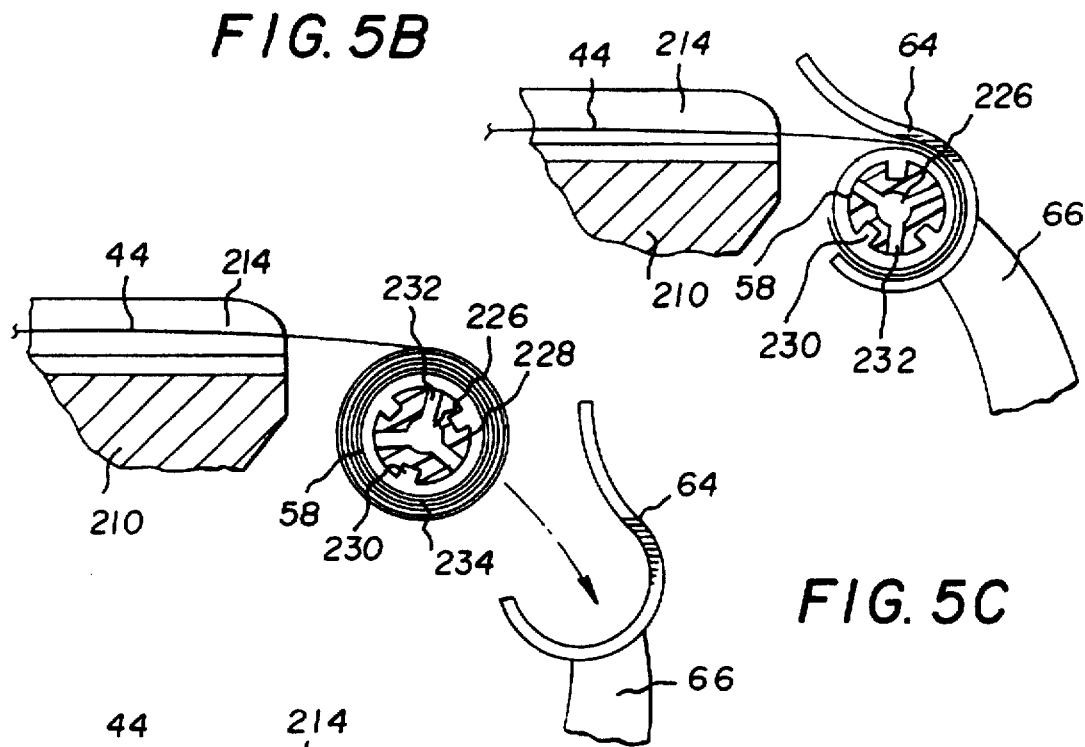
FIG. 5B
FIG. 5C
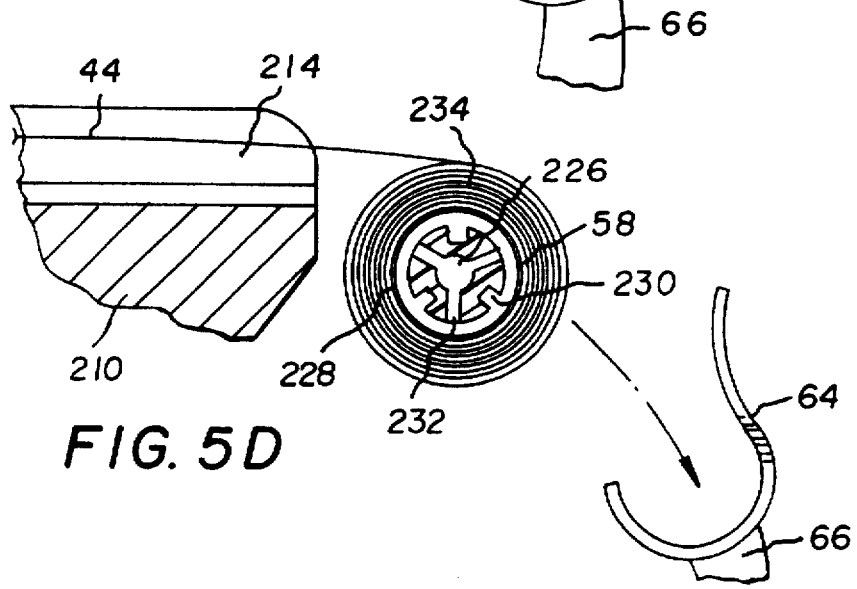
FIG. 5D

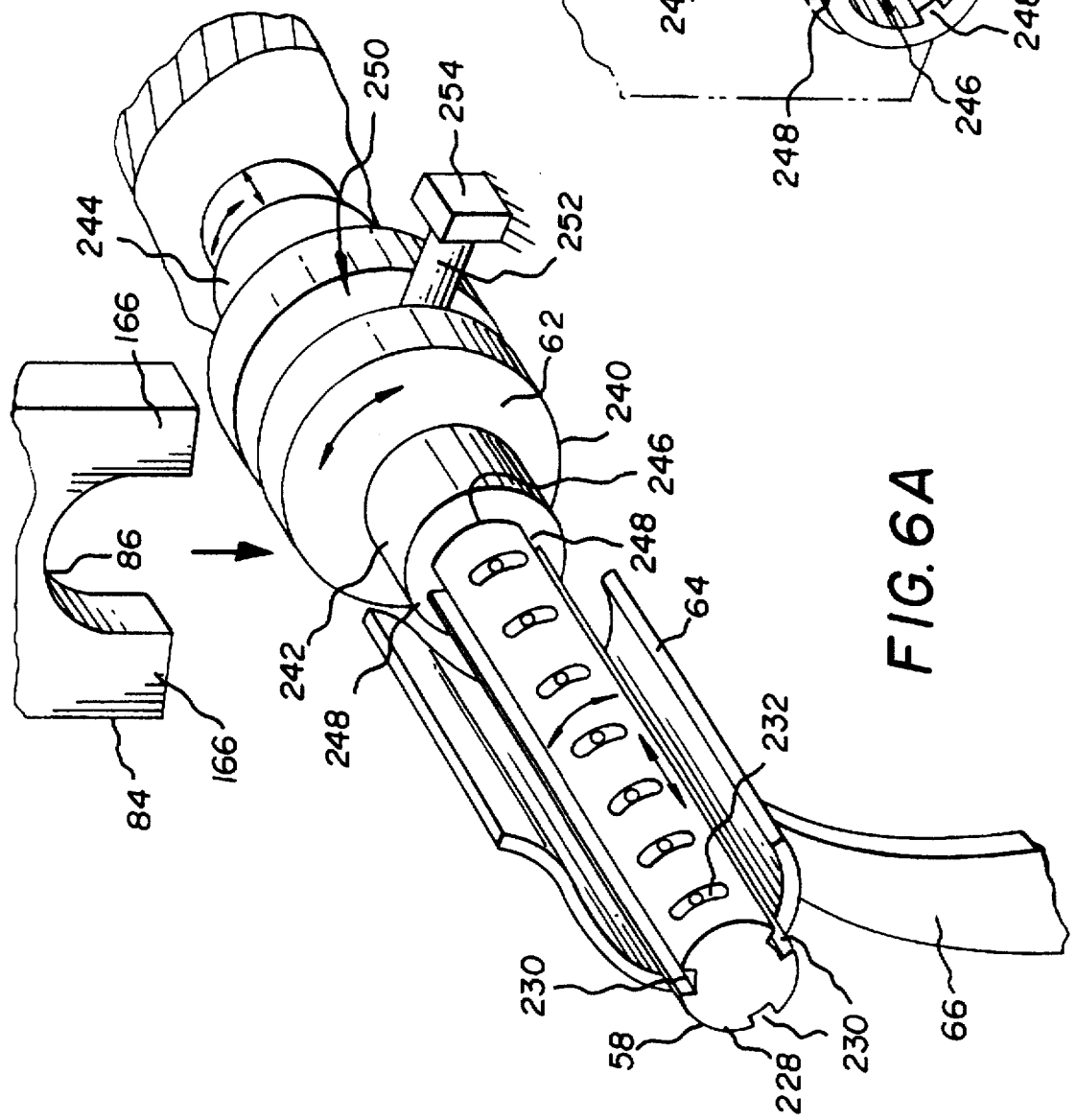
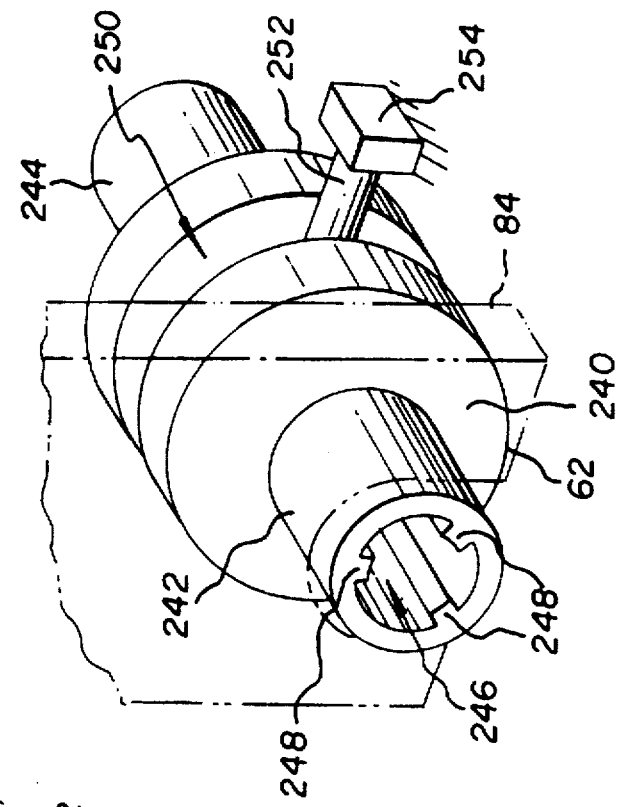
FIG. 6A
FIG. 6B

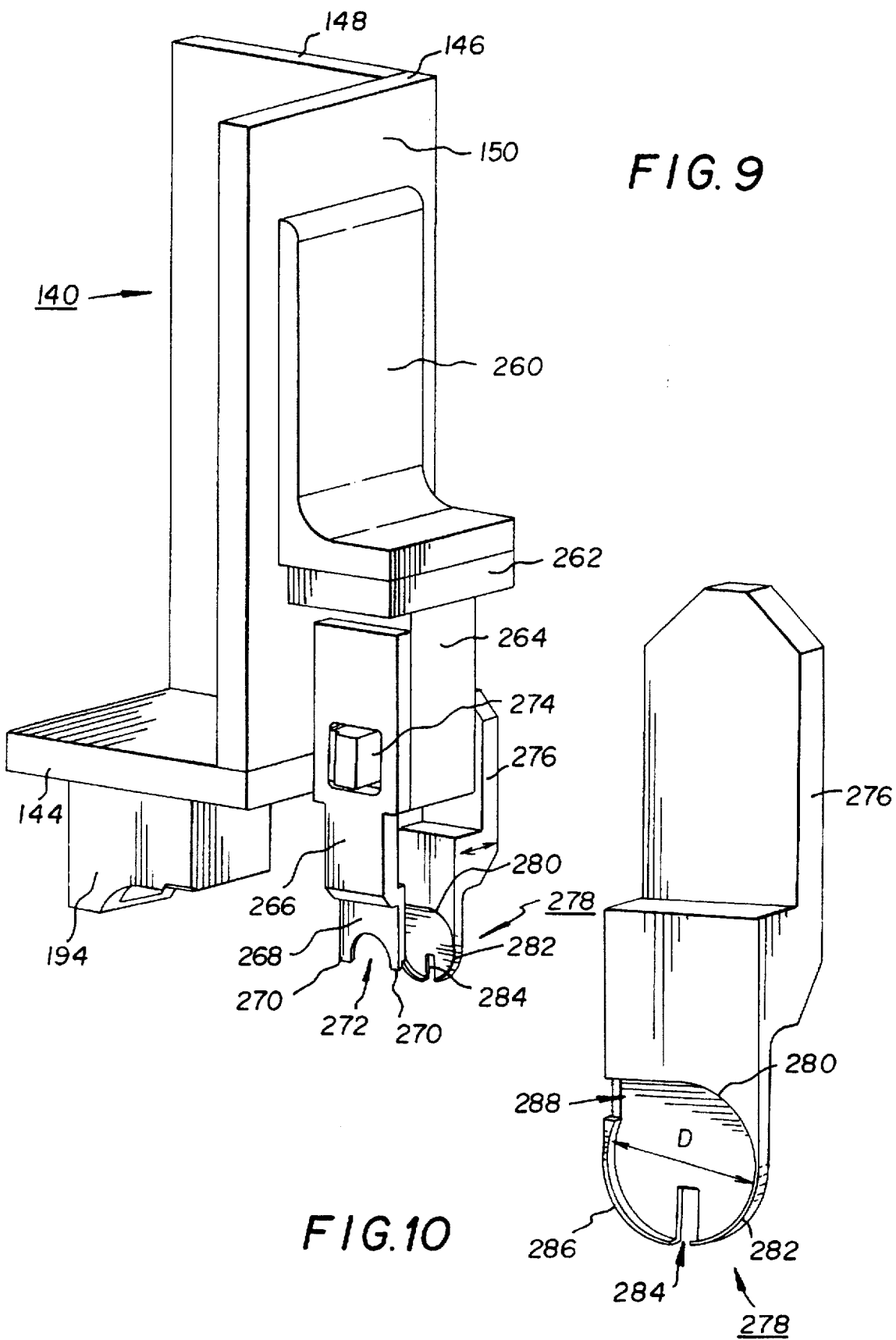

APPARATUS AND METHODS FOR LOADING A SINGLE-USE CAMERA AND SINGLE-USE CAMERA LOADABLE THEREBY

FIELD OF THE INVENTION

The invention concerns improvements to single-use cameras and to apparatus and methods for loading film into such cameras. More particularly, the invention concerns such cameras in which a length of filmstrip has been withdrawn from a light-tight cartridge and formed into a scroll of film, after which the cartridge and scroll have been loaded into a frame of the camera.

BACKGROUND OF THE INVENTION

In recent years, so-called single-use or disposable cameras have become popular, such as those disclosed in commonly assigned U.S. Pat. Nos. 4,890,130 and 5,235,366. Such cameras typically include an internal frame molded from a suitable plastic material. Mounted on the internal frame may be various internal camera components such as a thumbwheel for advancing the film, a taking lens and shutter assembly, a viewfinder, and a frame counterwheel, all of whose functions are familiar to those skilled in the camera technologies. The internal frame includes chambers for receiving a light-tight cartridge enclosing a spool to which is attached a trailing end of a filmstrip.

In one known method of loading film into the frame of a single-use camera, such as disclosed in U.S. Pat. No. 4,972,649, the filmstrip is withdrawn from the cartridge, leaving the trailing end attached to the spool. The withdrawn portion of the filmstrip is then formed into a scroll on a scrolling quill. The cartridge is moved axially into a first chamber in the frame, to permit the spool to engage a rotatable coupling mounted on the frame. The scroll is inserted axially or radially into a second chamber in the frame; so that, a length of filmstrip extends between the scroll and the cartridge, after which the scrolling quill is withdrawn. The scroll, without being wound on a spool or core of any sort, remains in the second chamber. In another method, the cartridge and scroll first are mounted in clips on the back cover of the camera and the scrolling quill is withdrawn. The cartridge and scroll then are inserted into their respective chambers when the back cover is assembled to the camera frame. In still another method, the cartridge is installed in a first chamber in the camera frame and the leading end of the filmstrip is threaded across the camera to a take-up spool in a second, opposite chamber. The filmstrip is then wound from the cartridge to the spool by engaging the spool with an external winding quill. In all instances, the user of the camera indexes the film back into the cartridge as pictures are taken.

Although the methods of loading disclosed in U.S. Pat. No. 4,972,649 appear to have been used rather widely, some problems have become apparent. Because the scroll is formed outside the camera or outside a clip on the back cover of the camera, the scroll must be held securely on the scrolling quill until installed in the camera or clip, to prevent the scroll from clock-springing to a loose configuration. Having to move the scrolling quill with the scroll necessarily complicates the apparatus and method of installation. In the case where the filmstrip is withdrawn from the cartridge after the cartridge has been installed into the camera frame, tedious hand operations or complicated threading mechanisms have been needed to attach a leading end of the filmstrip to the take-up spool. So, a need has arisen for improved apparatus and a method for loading such a camera, without requiring complex techniques for installing a scroll while still held on a scrolling quill or for attaching a leading end to a take-up spool.

Single-use cameras recently have become available which use an advanced photographic system (APS) cartridge of a type disclosed in commonly assigned U.S. Pat. No. 5,049,914. The APS cartridge encloses a spool to which a trailing end of a filmstrip is attached. Upon rotation of the spool, the leading end of the filmstrip is thrust from the cartridge past a selectively opened light-lock door. The filmstrip is returned to the cartridge after exposure and the light-lock door is closed. During photofinishing, the filmstrip again is thrust from the cartridge for developing and printing, and then returned to the cartridge. Later the customer may desire further photographic prints; so that, the film again must be thrust from the cartridge. Because of this intended repeated use of the cartridge and filmstrip, a need has arisen for apparatus and methods for loading a single-use camera which will ensure that the leading end of the filmstrip will not be damaged during loading. It would be desirable when using APS cartridges to be able to withdraw the filmstrip to form a scroll, in order to avoid using a take-up spool which might increase chances of damaging the leading end.

SUMMARY OF THE INVENTION

A primary objective of the invention is to provide improved apparatus and a method for loading film into single-use cameras.

Another objective is to provide an improved single-use camera and an improved internal frame for a single-use camera, in which a scroll of film can be installed easily and reliably.

Yet another objective is to provide an improved method for reloading a single-use camera.

The method of the invention is useful for loading a camera frame for subsequent inclusion in a single-use camera, the camera frame including an exposure opening, a first receiver on one side of the exposure opening for a light-tight film cartridge enclosing a spool to which is attached a trailing end of a filmstrip, and a second receiver on an opposite side of the exposure opening for a scroll formed from the filmstrip. The method includes steps of withdrawing a leading end of the filmstrip from the cartridge; positioning a scroll retainer near a scrolling quill, the scroll retainer including at least one abutment for engaging an external surface of a scroll to prevent clock-springing of a completed scroll; winding the leading end around a scrolling quill and into the scroll retainer; continuing the winding to form the filmstrip into a scroll of film around the scrolling quill, the scroll having an axis and an end of the scroll being within the scroll retainer, while leaving the trailing end attached to the spool within the cartridge; after winding the scroll, removing the scrolling quill from the scroll; after removing the scrolling quill, installing both the scroll and the scroll retainer into the second receiver, whereby a portion of the filmstrip extends across the exposure opening between the cartridge and the scroll; and withdrawing the scroll retainer axially from the second receiver to leave the scroll installed in the camera frame.

The cartridge may be installed into the first receiver after removing the scrolling quill from the scroll. While removing the scrolling quill, the scroll may be gripped axially to prevent telescoping of the scroll. The scroll retainer is positioned near a free end of the scrolling quill. The scroll retainer may include at least one protruding member for engaging an internal diameter of a scroll; and the winding step may also include winding the leading end around the protruding member of the scroll retainer. The cartridge may be a thrust cartridge and the withdrawing step may include thrusting the filmstrip from the cartridge. Alternatively, the withdrawing step may include pulling the filmstrip from the cartridge.

Another method of the invention is useful for reloading a single-use camera of the type previously described. This reloading method may include steps of removing at least a radially inner portion of the radially extended element to enable a scrolling quill to be inserted axially into the second receiver; withdrawing a leading end of a filmstrip from a cartridge; winding the leading end around a scrolling quill; installing the cartridge into the first receiver; installing the scroll into the second receiver; and after installing the scroll, removing the scrolling quill from the scroll through the one end of the second receiver. A radially outer portion of the extended element may remain to prevent a scroll from telescoping axially from the second receiver.

The apparatus of the invention is useful for loading a camera frame for subsequent inclusion in a single-use camera of the type previously described. The apparatus may include a nest for holding a cartridge; a mechanism for moving a leading end of a filmstrip from a cartridge; a scroll retainer including at least one abutment for engaging an external surface of a scroll to prevent clock-springing; a mechanism for positioning the scroll retainer near a scrolling quill; a scrolling guide for engaging a leading end around a scrolling quill; a rotatable scrolling quill to wind a scroll; a mechanism for removing the scrolling quill from a scroll and leaving a scroll engaged with the scroll retainer; a tool, operable after removal of the scrolling quill from a scroll, for installing a cartridge into the first receiver, and a scroll and the scroll retainer into the second receiver, whereby a portion of a filmstrip will extend across the exposure opening between a cartridge and a scroll; and a mechanism for removing the scroll retainer axially from the second receiver through the at least one open end.

When the cartridge is a thrust cartridge, the mechanism for moving rotates a spool within the cartridge to thrust a leading end to the scrolling quill. When the cartridge is a conventional 35 mm type of cartridge and has a leading end extended therefrom, the mechanism for moving pulls the leading end to the scrolling quill. Means may be included for gripping a scroll to prevent telescoping of a scroll during removal of the scrolling quill. Means may be included for stripping a scroll from the means for gripping, whereby a scroll remains in the second receiver.

The scrolling guide may include a pair of guide members pivotably mounted near the scrolling quill, each guide member comprising an elongated recess for partially surrounding the scrolling quill; an entrance slot between the guide members for receiving a leading end; and means for moving the guide members away from the scrolling quill after a leading end has become cinched thereto. Means may be included for moving the member for engaging and the scroll retainer toward or away from each other to engage or release the scroll.

The scroll retainer may include a protruding member for engaging an internal diameter of a scroll. The camera frame may include at the open end of the second receiver, at least one radially extended element for preventing (i) a scrolling quill having a scroll of film wound thereon from being installed axially or radially into the second receiver and (ii) a scroll from telescoping axially from the second receiver; and clearance between the radially extended element and the wall of the second receiver, the clearance being sufficient for axial removal of an installation tool for the scroll. When the radially extended element is included in the camera frame, the scroll retainer includes a through slot to allow the scroll retainer to move axially past the radially extended element. The scroll retainer may include a plurality of circularly curved abutment walls for engaging the external surface of the scroll; and an entrance slot into the retainer for the filmstrip.

A single use camera in accordance with the invention may include a camera frame with an exposure opening, a first receiver on one side of the exposure opening for a light-tight film cartridge enclosing a spool to which is attached a trailing end of a filmstrip; a second receiver on an opposite side of the exposure opening for a scroll formed from the filmstrip, the second receiver having a longitudinal axis, at least one open end, and a wall extended at least partially around the axis; extended into the open end of the second receiver, at least one radially extended element for preventing (i) a scrolling quill having a scroll of film wound thereon from being installed axially or radially into the second receiver and (ii) a scroll from telescoping axially from the second receiver; and clearance between the radially extended element and the wall of the second receiver, the clearance being sufficient for axial removal of an installation tool for the scroll.

The invention provides various advantages. Since winding of the scroll is done outside the camera frame, the apparatus and method are less encumbered by a need to accommodate camera geometry. Tension in the film can be controlled readily by controlling the speeds of the motor driving the spool of the cartridge and motor driving the scrolling quill. The scroll retainer permits withdrawal of the scrolling quill without causing the scroll to clock-spring to a larger diameter which could prevent proper installation into a camera frame. Because the scrolling quill does not have to accompany the scroll into the camera frame, the apparatus and method are simplified considerably, compared to the prior art. A good quality scroll is produced with well-defined, essentially flat ends which ensure ease of insertion into a camera frame. The improved camera frame can be reloaded using the apparatus of the invention or, upon removal of the radially extended element at the open end of the scroll receiver, using prior art apparatus.

BRIEF DESCRIPTION OF THE DRAWINGS

FIGS. 5A, 5B, 5C and 5D show fragmentary elevation views of the mechanism of FIG. 4 at successive stages of scrolling.

FIGS. 6A and 6B show fragmentary perspective views of a vacuum actuated film scrolling quill included in the mechanism of FIG. 4, with the quill in respective extended and retracted positions.

FIG. 9 shows a front perspective view of a robotically supportable cartridge and film scroll installation tool in accordance with a second embodiment of the invention.

FIG. 10 shows a perspective view of a scroll retainer of the tool of FIG. 9.

DETAILED DESCRIPTION OF THE INVENTION

Figure 1:
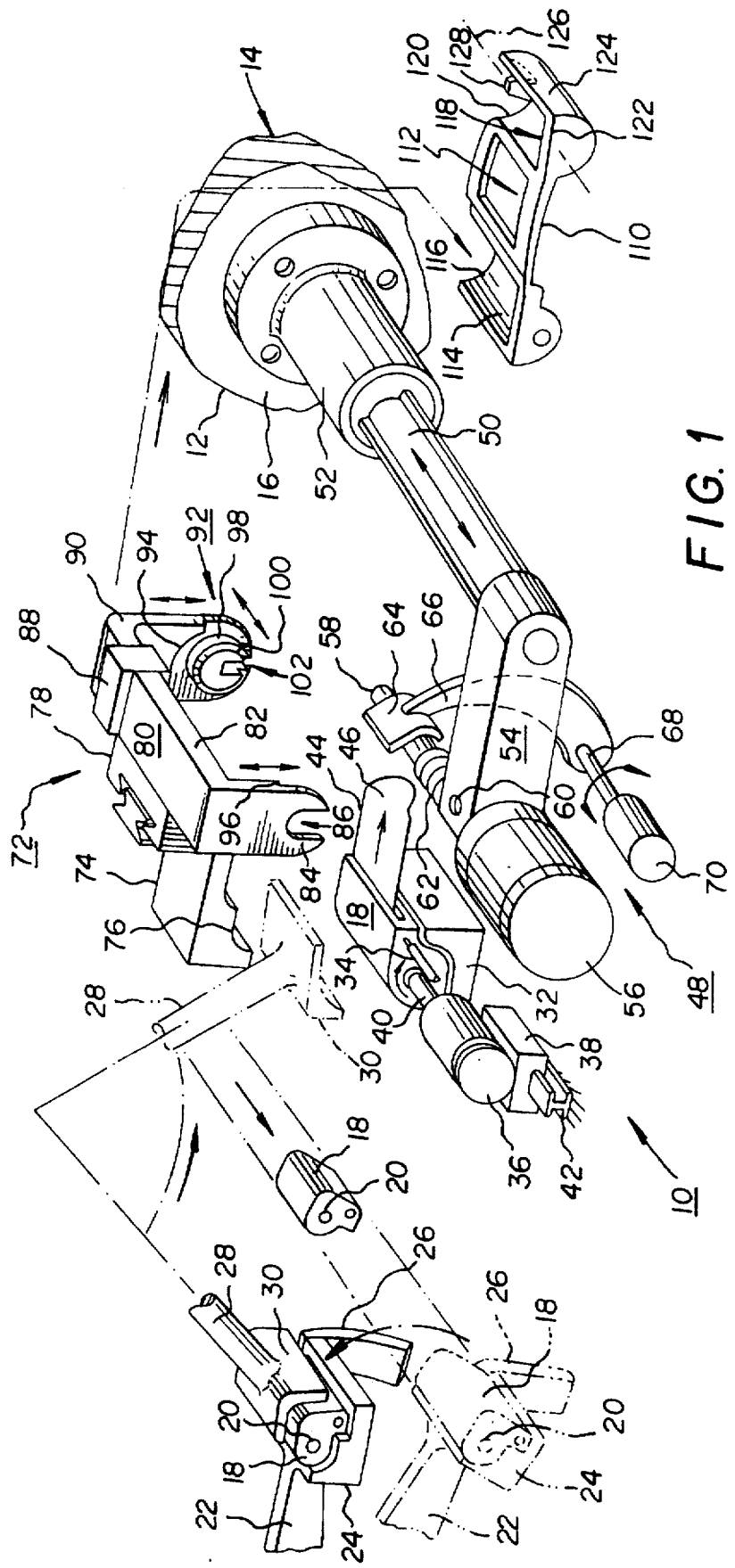
FIG. 1 shows a schematic perspective of an apparatus in accordance with the invention.

The following is a detailed description of various embodiments of the invention, reference being made to the drawings in which the same reference numerals identify the same elements of structure in each of the several Figures.

FIG. 1 illustrates an overall arrangement of an apparatus 10 for loading a single-use camera frame, in accordance with the invention. A rigid face plate 12, shown only fragmentarily, supports most of the components of the apparatus. A lighted space may be located at a back side 14 of the face plate, while a darkened space may be located at a front side 16; so that, the face plate serves as a wall between such lighted and darkened environments. A light-tight film cartridge 18, such as an APS cartridge, encloses an internal spool 20 having end hubs which are accessible through openings in the cartridge wall, as illustrated schematically. A light-lock door, not illustrated, closes the cartridge in the manner familiar for APS cartridges. Cartridge 18 is passed through face plate 12 via a suitable conduit, not illustrated, and picked up by a first transfer arm 22 having a vacuum gripper 24 for securely holding the cartridge. A keeper plate 26 extends downwardly from gripper 24 to block movement of subsequent cartridges when transfer arm 22 is raised to a position where a second transfer arm 28 can acquire the cartridge using a vacuum gripper 30. Transfer arm 28 is rotated through about ninety degrees to reorient the cartridge for placement on a vacuum nest 32 which holds the cartridge during scrolling.

Once the cartridge has been placed on nest 32, a light-lock door opening tool 34 is advanced into engagement with a hub of the light-lock door and then rotated to open the door. Simultaneously, a thrusting motor 36 having a keyed drive shaft 40 is advanced into engagement with spool 20. When an APS cartridge is used, spool 20 will be locked in a predetermined position within the cartridge; so that, keyed shaft 40 readily engages the spool. Motor 36 and tool 34 may be supported, for example, for reciprocating movement on a slide 38 which is moved on a fixed track 42 by a conventional oscillating actuator, not illustrated. Upon rotation of spool 20, a filmstrip 44 is thrust from the cartridge; so that, its leading end 46 moves toward a scrolling mechanism 48 which will form a scroll of film from a leading portion of the filmstrip. Thus, a mechanism is provided for moving the leading end from the cartridge. As used in this description, a "scroll" of film is formed on a winding quill which is then withdrawn; so that, a completed scroll is not supported on a spool or core. An alternative arrangement for use with a conventional 35 mm cartridge will be discussed with regard to FIGS. 15 and 16.

The scrolling mechanism is supported on a cantilever, splined shaft 50 mounted for axial movement through a linear bearing assembly 52 supported by face plate 12. A conventional oscillating actuator, not illustrated, may be mounted to back side 14 to drive shaft 50 back and forth. Within the darkened environment, shaft 50 supports at its free end a laterally extended arm 54 on which a scrolling motor 56 is mounted. A scrolling quill 58 extends from motor 56 toward face plate 12. An axis of rotation of the scrolling quill extends transverse to, but somewhat below, a plane of movement of filmstrip 44 from cartridge 18. A port 60 for vacuum or pressurized air is provided in arm 54 and is operatively connected to scrolling quill 58 via a conventional rotary union or sliding gland, not illustrated, the union or gland being supported by arm 54. This arrangement provides both vacuum for acquiring leading end 46 at the beginning of scrolling, and pressurized air at the stripping of a completed scroll. A scroll stripping hub or nut 62 is mounted on scrolling quill 58 for rotation therewith, as will be explained in detail with regard to FIGS. 6A and 6B.

On an opposite side of the scrolling quill from nest 32, a scrolling guide shell 64 is mounted on a pivotable arm 66 connected to a drive shaft 68 of a motor 70. Above the scrolling quill, a robotically supportable cartridge and scroll installing mechanism or tool 72 may be positioned by means such as a conventional programmable robot, not illustrated. Tool 72 may include a frame 74 which supports a vacuum gripper 76 for removing cartridge 18 from nest 32. A slide 78 is attached to frame 74 to support a gripper 80 having a frame 82. A depending leg of frame 82 tapers downwardly to form a downwardly extended fork 84 having a pair of thin tines separated by a central opening 86 which can straddle the scrolling quill between stripping hub 62 and guide shell 64. A single-acting horizontal linear actuator 88 connects frame 82 to a horizontally movable, downwardly extended support 90.

Figure 2:
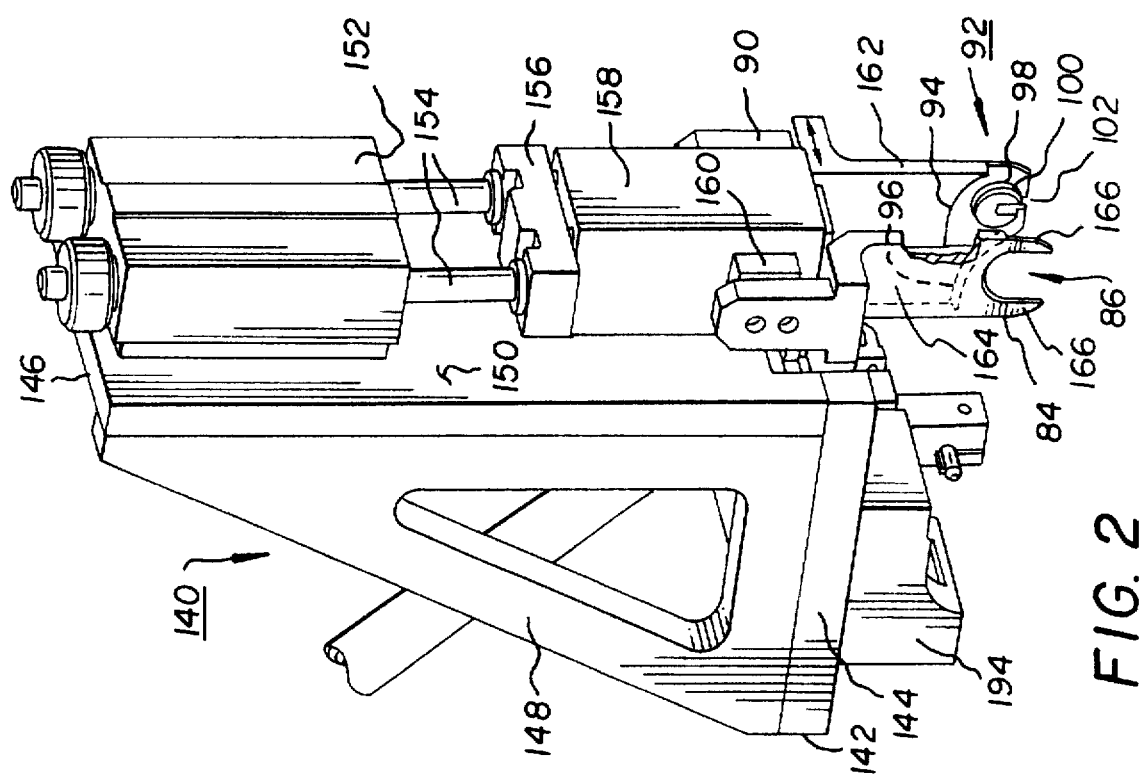
FIG. 2 shows a front perspective view of a robotically supportable cartridge and film scroll installation tool in accordance with a first embodiment of the invention.

As shown in FIGS. 1 and 2, a scroll retainer 92 is formed at a lower end of support 90. The purpose of the scroll retainer is to prevent a scroll from clock-springing to a larger diameter upon withdrawal of the scrolling quill, which could prevent proper installation of a scroll into a camera frame. The surface of support 90 facing fork 84 is relieved to provide a downwardly curved abutment or guide wall 94 for guiding leading end 46 downward to engage scrolling quill 58 and scrolling guide 64, as subsequently will be described. The surface of fork 84 facing support 90 also is relieved to provide a second downwardly curved abutment or guide wall 96 for the other edge of filmstrip 44, as shown in dashed lines in FIG. 2. Abutment 96 is a mirror image of abutment 94. Below abutment 94 and opposite central opening 86, a preferably cylindrical protruding member 98 is provided on support 90. Member 98 has a diameter somewhat smaller than that of scrolling quill 58. A tapered end 100 may be provided on member 98. As an alternative to a cylindrical member 98 as illustrated, a cylindrical shell or circular array of guide pins could be used, provided the effective outside diameter or the shell or array is smaller than that of scrolling quill 58. To enable retainer 92 to be withdrawn from a receiver in a camera frame, as will be described subsequently, a radially extended through slot 102 is provided which extends upward from the bottom edge of the retainer to about the center of protruding member 98. Retainer 92 also can hold a scroll if cylindrical member 98 is omitted; however, actuator 98 must provide adequate frictional engagement with the ends of the scroll to prevent clock-springing.

Figure 13:
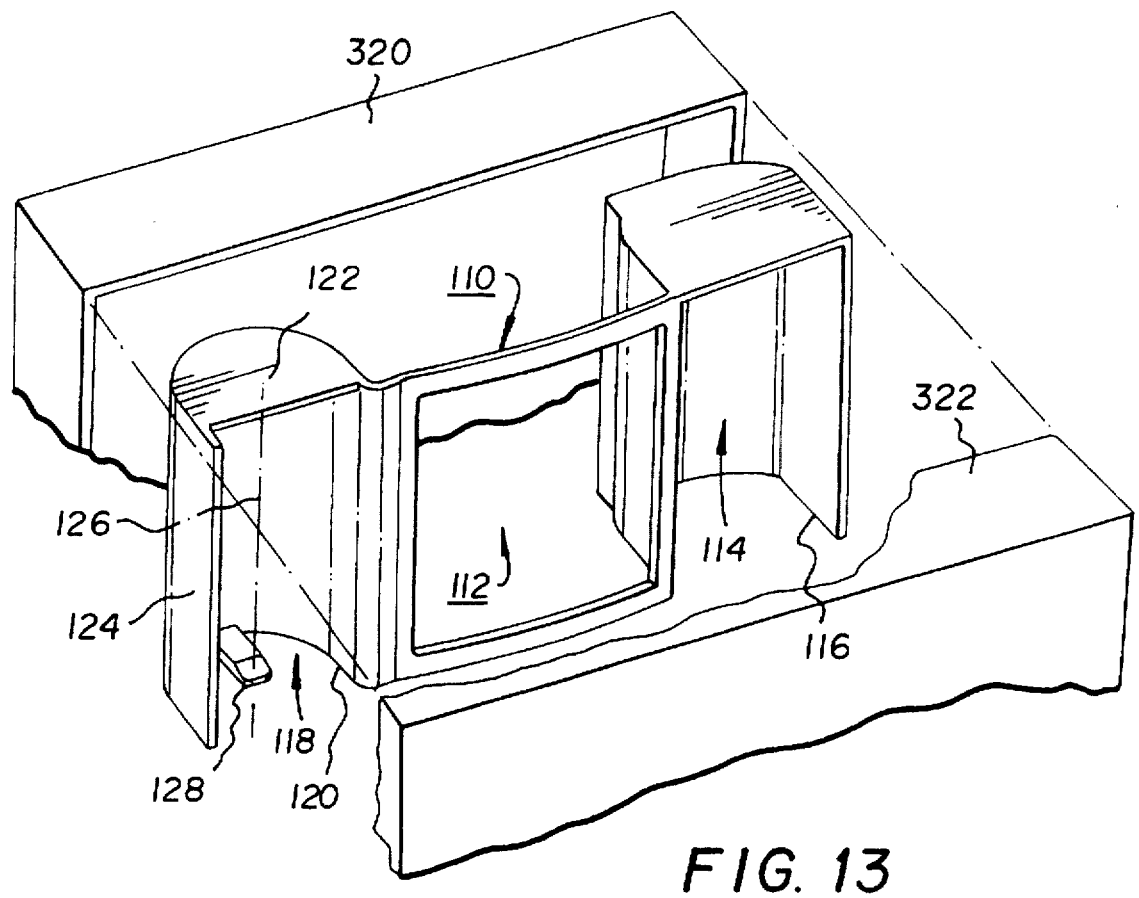
FIG. 13 shows an exploded, perspective, partially fragmentary view of a single-use camera having an interior frame which can be loaded in accordance with the invention.

To the right of scrolling mechanism 48, as viewed in FIG. 1, a conventional part handling nest, not illustrated, is used to support an internal camera frame 110 to be loaded with a cartridge and film scroll. As shown in FIGS. 1 and 13, frame 110 includes a central exposure opening or gate 112. On one side of opening 112 is a receiver or chamber 114 for receiving cartridge 18 axially through an open end 116. On the opposite side of opening 112 is a chamber or receiver 118 for receiving a scroll of film. Chamber 118 has an open end 120 and a closed opposite end 122, with a semi-cylindrical, arcuate wall 124 extending between ends 116, 120. Receiver 118 has a longitudinal axis 126. Just inside open end 120 is provided a radially inwardly extended element 128, such as a finger or tang, which extends just past axis 126. As will become apparent from the following description, element 128 is positioned to prevent a scrolling quill having a filmstrip wound thereon from being inserted axially or radially completely into receiver 118. Element 128 also will prevent telescoping of a scroll installed in receiver 118. Element 128 may be centered in open end 120, as shown, or may be offset angularly to either side. More than one element 128 may be used. On either side of element 128, open clearance is provided which is sufficient for axial removal of an installation tool including retainer 92 or the retainers of FIGS. 9, 10 and 11, 12. In some cameras, element 128 may not be required; and in such instances, through slot 102 may be omitted.

From the foregoing description and FIGS. 1 and 2, those skilled in the art will understand the overall operation of the apparatus of the invention. See also FIGS. 5A to 5D. Fork 84 is lowered to straddle the scrolling quill. The scrolling quill is then moved axially into position opposite nest 32. Leading end 46 is thrust or withdrawn from cartridge 18 until it is guided by abutments 94, 96 and scrolling guide shell 64 to pass between scrolling guide shell 64 and scrolling quill 58. As the leading end is advanced, scrolling quill 58 is rotated slightly faster than spool 20. Vacuum is applied through the scrolling quill to acquire leading end 46 and cinch it to the scrolling quill. Due to the higher speed of rotation of the scrolling quill, the filmstrip within cartridge 18 will be drawn tighter around spool 20, thus developing tension in the filmstrip between spool 20 and scrolling quill 58. Motor 36 applies a braking torque to help maintain tension in the film, but the torque applied by motor 56 essentially determines the magnitude of the tension in the filmstrip. By monitoring the speed of motor 36, proper cinching of the filmstrip to the scrolling quill can be determined. A vacuum sensor also can be provided to sense the level of vacuum developed at port 60 as winding begins, a substantial drop in pressure being an indication that cinching has occurred.

When proper cinching has occurred, guide shell 64 is moved away from the scrolling quill and motor 56 continues to rotate until a scroll of the desired diameter has been formed. In a conventional manner, a sensor, not illustrated, may be provided for counting edge perforations along one edge of the filmstrip to monitor the number of frames withdrawn from the cartridge. When the passage of the last frame is sensed, an end-of-scroll perforation on the opposite edge may be sensed by a further sensor, also not illustrated, to indicate completion of a scroll. Rotation of spool 20 and scrolling quill 58 then is stopped. The vacuum applied to the scrolling quill is released and a flow of pressurized air is admitted into the center of the scroll to release the scroll from the quill; so that, the scroll is free to clockspring outwardly into firmer engagement with abutments 94, 96. At the same time, motor 56 reverses direction momentarily to provide further assurance that leading end 46 releases from the scrolling quill. Actuator 88 retracts; so that, the scroll is held securely between fork 84 and scroll retainer 92. Scrolling quill 58 then is withdrawn from the scroll, which allows the inside diameter of the scroll to clock-spring inwardly into engagement with protruding member 98. Further clock-springing of the scroll is prevented by engagement with abutments 94, 96 and member 98.

To transfer the cartridge and scroll to the camera frame, vacuum is applied to gripper 76 to acquire cartridge 18 from nest 32. Gripper 80 is raised along slide 78 to move the scroll above the level of the cartridge. Installing tool 72 is then lifted away from scrolling mechanism 48 and toward camera frame 110. At the camera frame, cartridge 18 is slipped axially into receiver 114, to enable spool 20 to engage with a film indexing mechanism supported by the camera frame, not illustrated. Once the cartridge is in place, gripper 80 is lowered to place the completed scroll into receiver 118. In a loaded camera frame, a length of filmstrip 44 extends from cartridge 18 across opening 112 to the completed scroll.

Figure 3:
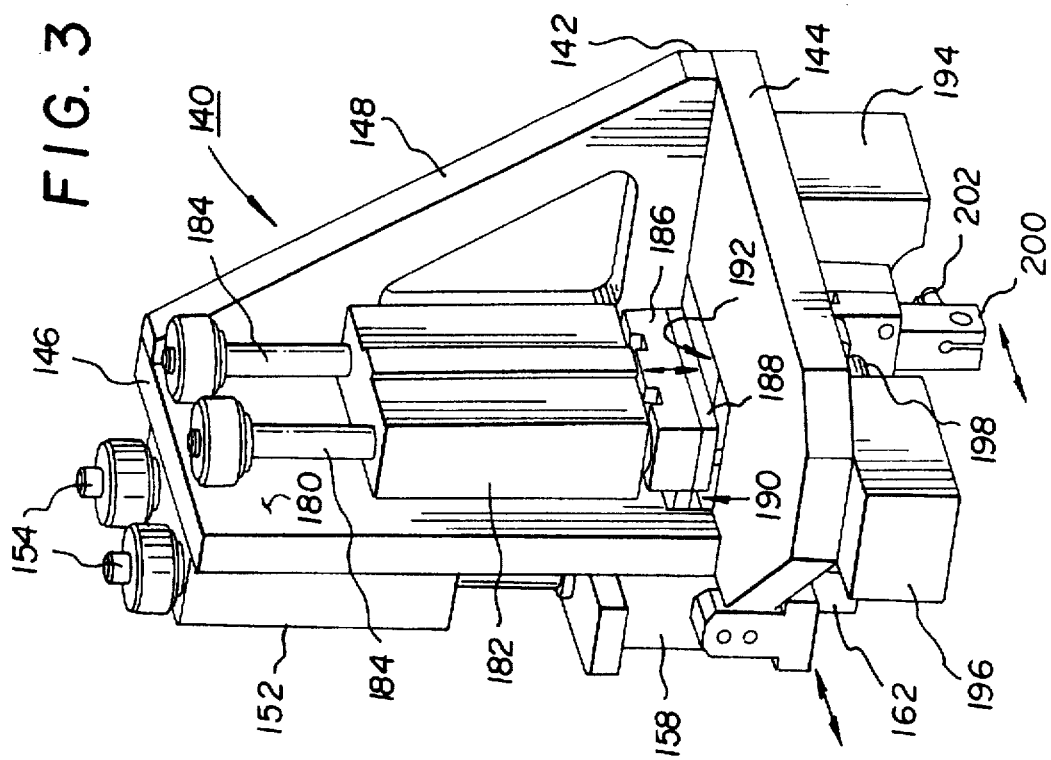
FIG. 3 shows a rear perspective view of the tool of FIG. 2.

While FIG. 1 illustrates schematically an installing tool 72, FIGS. 2 and 3 illustrate an actual embodiment of a robotically supportable cartridge and film scroll installation tool 140. An L-shaped frame 142 includes a bottom plate 144 and an actuator support plate 146. A side plate 148 extends between plates 144, 146 to provide rigidity. On a front side 150 of support plate 146 is mounted a linear actuator 152 having a pair of actuator rods 154. A gripper support plate 156 is attached to the lower ends of the actuator rods. Fixedly attached to support plate 156 is a gripper mounting block 158 having a transverse passage in which a single-acting, horizontal linear actuator 160 is mounted. A depending leg 162 supports scroll retainer 92 and is mounted for movement by actuator 160. Fixedly mounted opposite depending leg 162 is a depending leg 164 for supporting fork 84. Also as seen in FIG. 2, the central opening 86 of fork 84 is flanked by thin tines 166 for closely engaging scrolling quill 58 during scrolling. When actuator 152 is operated, rods 154 raise or lower fork 84 and scroll retainer 92.

On a back side 180 of support plate 146 is mounted a linear actuator 182 having a pair of actuator rods 184. A stripper support plate 186 is attached to the lower ends of the actuator rods and a stripper plate 188 is attached to plate 186. As seen in FIG. 3, an opening 190 is provided through support plate 146; and an opening 192 is provided through bottom plate 144. Stripper plate 188 extends through opening 190 between legs 162, 164. When actuator 182 is operated, rods 184 raise or lower support plate 186 and stripper plate 188 through opening 192.

Beneath bottom plate 144, a vacuum gripper 194 is mounted for lifting cartridge 18 from nest 32. Adjacent to gripper 194, in a position which is opposite motor 36 and shaft 40 in the arrangement of FIG. 1, is mounted a linear actuator 196 having an output shaft 198 on which is mounted a depending tool support 200. A splined stub shaft 202 is held by tool support 200 in a position axially aligned with spool 20 when gripper 194 is engaged with cartridge 18 at nest 32. When a scroll has been completed, spool 20 will stop rotating at a predetermined orientation. Actuator 196 is operated to extend shaft 198 and bring splined shaft 202 into engagement with spool 20 to prevent rotation of the spool during transfer for loading into camera frame 110.

Figure 4:
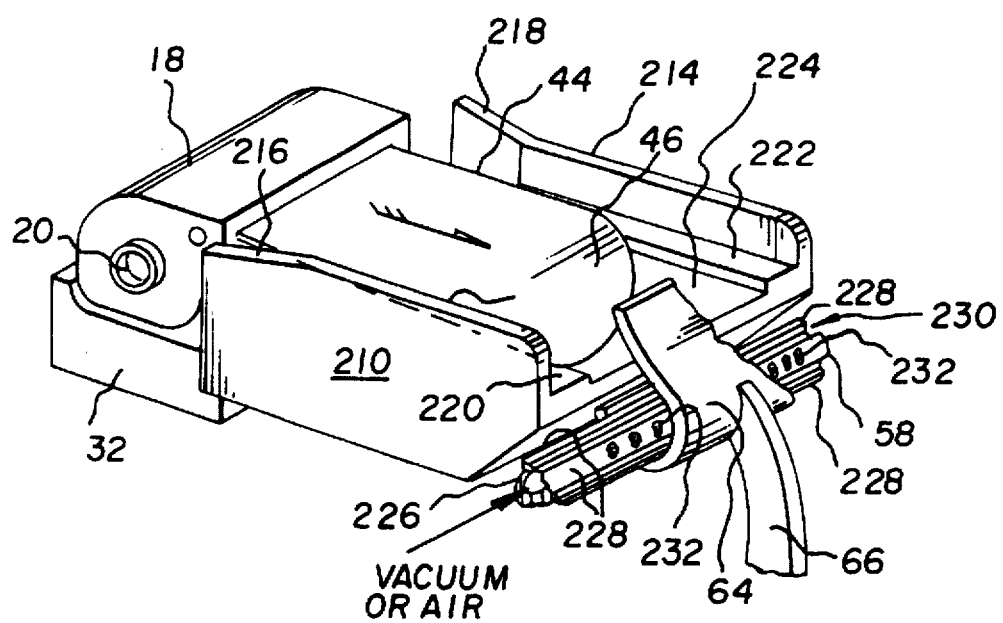
FIG. 4 shows a fragmentary perspective view of a film scrolling mechanism included in the apparatus of FIGS. 1 to 3.

FIG. 4 illustrates various details of one embodiment of scrolling mechanism 48. A filmstrip guide track 210 preferably is provided between nest 32 and scrolling quill 58 to ensure that the filmstrip is delivered precisely for scrolling. Track 210 includes a pair of side walls 212, 214 separated by a distance slightly greater than the transverse width of the filmstrip. Flared inlet portions 216, 218 are provided on the side walls to allow for some misalignment with the nest. To prevent scratching the central image area of the filmstrip, a pair of edge rails 220, 222 are provided for supporting the filmstrip, one rail on each side of a central image relief slot 224.

Scrolling quill 58 includes a central hollow core 226 through which vacuum or pressurized air may be applied via port 60. Extending radially outwardly from the core are a plurality of longitudinally extended support lands 228, three as illustrated, separated by longitudinally extended grooves 230. At the outer surface of each land, a row of ports 232 communicates with the hollow core. As shown in FIG. 5A, scrolling begins with guide shell 64 closely engaged with the rotating scrolling quill. Vacuum is applied through ports 232 to bring leading end 46 into close contact with the scrolling quill, as shown in FIG. 5B. When the filmstrip has cinched to the scrolling quill, a scroll 234 begins to grow, necessitating removal of guide shell 64 after a few convolutions, as shown in FIG. 5C. Rotation of the scrolling quill is stopped when a desired scroll diameter is reached, as shown in FIG. 5D.

FIGS. 6A and 6B illustrate details of the scrolling mechanism which cooperate to strip a scroll from the scrolling quill. Stripping hub or nut 62 comprises a central cylindrical body 240 having axial extensions 242, 244 of smaller diameter. An axial bore 246 extends through body 240, bore 246 being configured to complement the external geometry of scrolling quill 58. Thus, bore 246 includes a plurality of radially inwardly extended stripping fingers 248, three as illustrated, which extend into grooves 230 on the scrolling quill. Body 240 also includes an external, circumferential groove 250. To prevent hub 62 from moving axially when the scrolling quill is withdrawn, a retaining probe 252 extends from a fixed attachment block 254 into groove 250.

When a scroll has been formed, the scrolling quill is stopped. Vacuum acting in bore 226 is released and the scrolling quill is reverse rotated through an arc of about five to ten degrees while pressurized air is directed through ports 232. The scroll thus is released from the quill to enable the scroll to clockspring outward into full contact with abutments 94, 96 in scroll retainer 92. The scrolling quill then is withdrawn through hub 62, which is held against axial movement by probe 252. As the scrolling quill moves through the scroll, stripping fingers 248 engage the inner convolutions of the filmstrip to prevent telescoping of the scroll. When the scrolling quill has been completely withdrawn, the inner convolutions engage element 98, which prevents clock-springing. As indicated in FIG. 6B, fork 84 also prevents telescoping of outer convolutions of the scroll.

Figure 7:
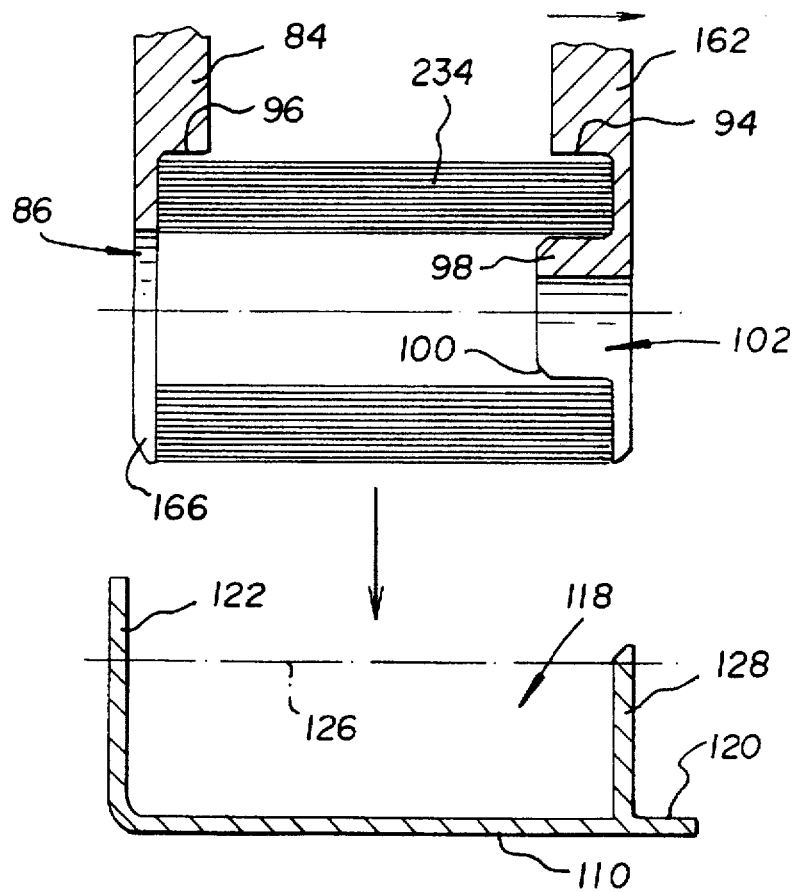
FIG. 7 shows a sectional view of a film scroll gripped by the tool of FIGS. 2 and 3 just prior to insertion into a receiver of a camera frame.
Figure 8:
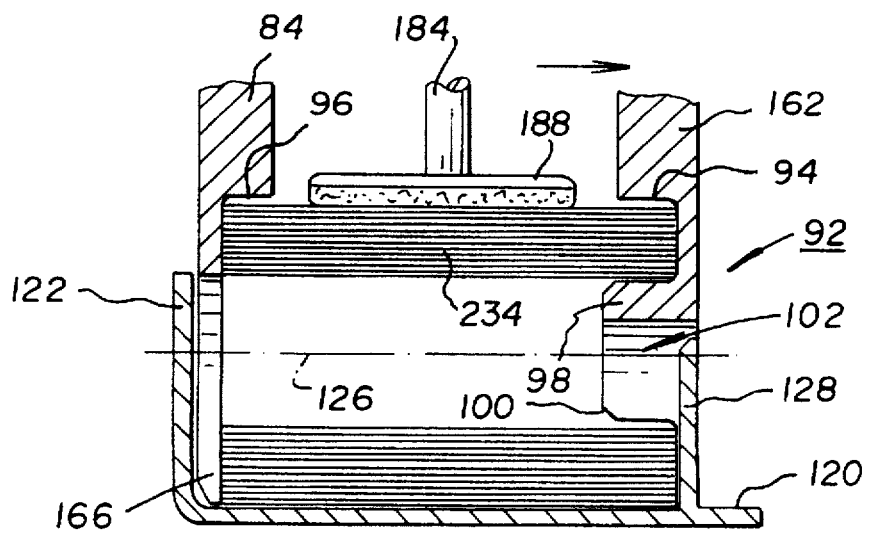
FIG. 8 shows a sectional view of a film scroll gripped by the tool of FIGS. 2 and 3 after insertion into a receiver of a camera frame, with a stripper plate engaged with the scroll.

FIGS. 7 and 8 illustrate schematically how scroll 234 is installed into receiver 118. When the scrolling quill has been withdrawn, actuator 160 is operated to grip the scroll axially between fork 84 and retainer 92. From the positions of FIG. 7, the scroll is lowered into receiver 118 to the position of FIG. 8, in which the scroll is located between closed end 122 and radially extended element 128. Fork 84 fits into a clearance space between the scroll and closed end 122. Stripper plate 188 is lowered by actuator 182 into contact with the scroll. Actuator 160 is operated to move scroll retainer 92 axially to the right, as viewed in FIG. 8. Through slot 102 passes around element 128 and the remainder of scroll retainer 92 passes through the clearance between element 128 and wall 124 of receiver 118. When protruding member 98 has been fully withdrawn from the inside bore of the scroll, stripper plate 188 is raised; and actuator 152 raises fork 84 and scroll retainer 92 above the camera frame. Tool 72 is then returned to the position of FIG. 1 to await the next cartridge and camera frame.

FIGS. 9 and 10 illustrate an second embodiment of a tool 72 for installing a scroll and cartridge into a camera frame. An L-shaped bracket 260 is attached to front side 150. A gripper support plate 262 is supported by bracket 260 and a downwardly extended mounting block 264 is supported by plate 262. Fixedly mounted to block 264 is a downwardly extended support leg 266. A fork 268 is formed at the lower end of support leg 266 and includes a pair of short, thin tines 270 on either side of a central opening 272 to clear scrolling quill 58. As shown, tines 270 extend to about the centerline of the scroll, which will correspond to about the centerline of chamber 118. Since tines 270 are shorter than tines 166 of fork 84 of the first embodiment, a smaller clearance space is required at closed end 122. A single-acting, horizontal linear actuator 274 is mounted in a transverse passage of mounting block 264. A depending leg 276 supports a scroll retainer 278 and is mounted for movement by actuator 274. The surface of leg 276 facing fork 268 is relieved to provide a downwardly curved abutment or guide wall 280 for guiding leading end 46 downward to engage scrolling quill 58 and scrolling guide 64, as previously described. The surface of fork 268 facing leg 276 also is relieved to provide a second downwardly curved abutment or guide wall, not illustrated, for the other edge of filmstrip 44. The second abutment is a mirror image of abutment 280. A circularly curved abutment wall 282 extends downward from abutment 280 and ends at a radially extended through slot 284 provided to clear element 128 in the manner previously described. On the opposite side of slot 284, a circularly curved abutment wall 286 extends upward and ends at an entrance slot 288 for filmstrip 44. The radius of curvature of abutment walls 282, 286 thus determines the maximum permissible diameter D of a scroll. A protruding member like member 98, 100 may be included to provide further support for a scroll, but is not required to prevent clock-springing. Abutment 280 and curved walls 282, 286 thus cooperate to enable scroll retainer 278 to limit outward clock-springing of a scroll when the scrolling quill is withdrawn in the manner previously described. In some cameras, element 128 may not be required; and in such instances, through slot 284 may be omitted.

In use of the tool of FIGS. 9 and 10, the tool is positioned at the scrolling quill with tines 270 on either side of the quill. Actuator 274 is operated to position retainer 278 close to the outer end of the quill; however, the scroll need not be gripped between tines 270 and retainer 278 during scrolling. Scrolling then proceeds as previously described and the quill is withdrawn. The scroll clock-springs outward into engagement with retainer 278 and the mirror image abutment on fork 268. The cartridge and scroll are then installed in the camera frame as previously described. To ease installation, receiver 118 preferably should be provided with circumferential reliefs, not illustrated, to receive abutment walls 282, 286, thereby allowing the scroll to seat completely in the receiver. Stripper plate 188 preferably is used with this embodiment, but may be omitted for some applications. When the stripper plate is provided, it is lowered by its actuator into contact with the scroll. Actuator 274 is operated to move scroll retainer 278 axially to the right, as viewed in FIG. 9. Through slot 284 passes over element 128. When retainer 278 has been moved clear of the scroll, the stripper plate is raised; then, fork 268 and retainer 278 are raised above the camera frame. Tool 72 is then returned to the position of FIG. 1 to await the next cartridge and camera frame.

Figures 11, 12:
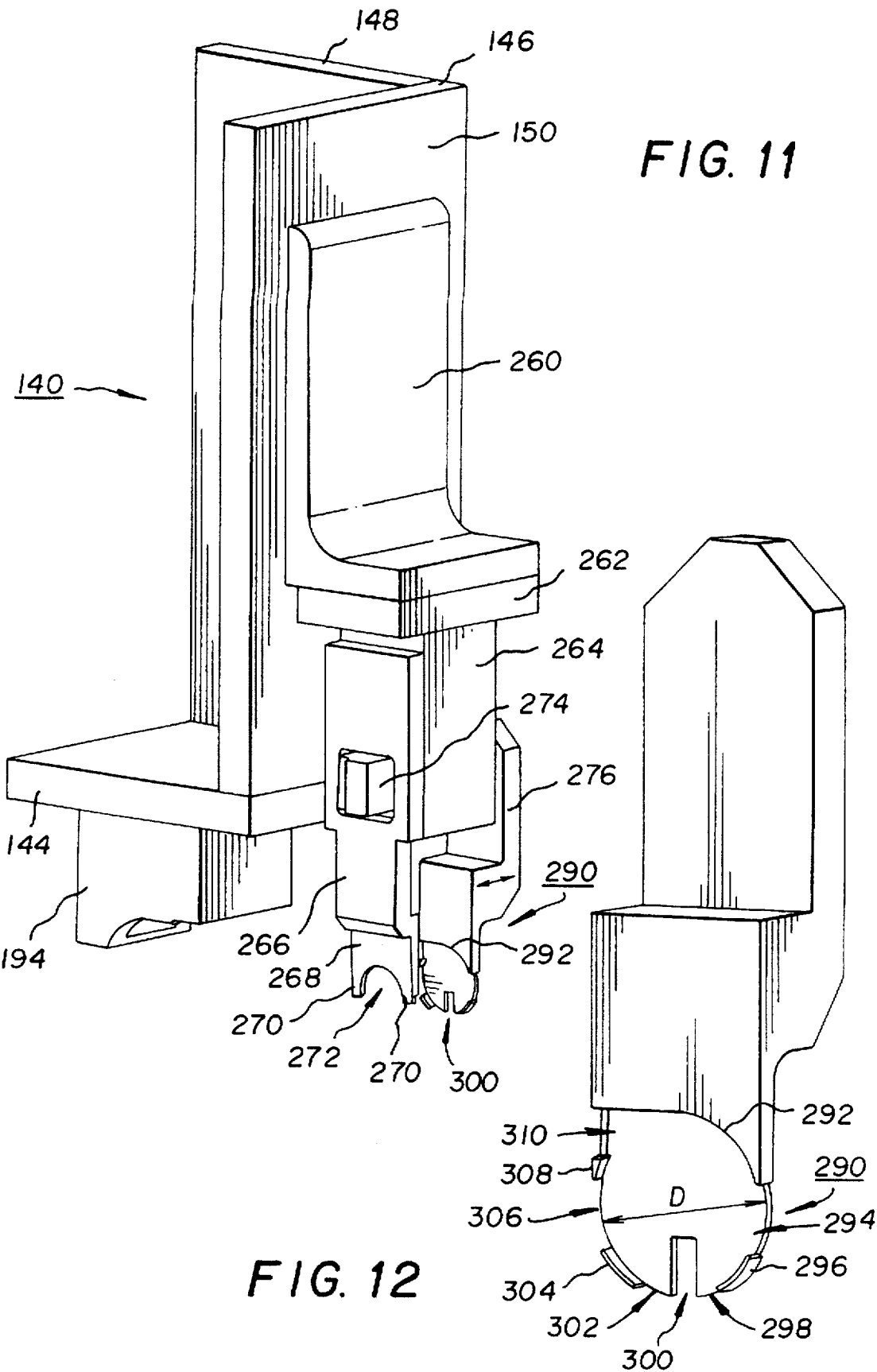
FIG. 11 shows a front perspective view of a robotically supportable cartridge and film scroll installation tool in accordance with a third embodiment of the invention.
FIG. 12 shows a perspective view of a scroll retainer of the tool of FIG. 11.

FIGS. 11 and 12 illustrate a third embodiment of a tool 72 for installing a scroll and cartridge into a camera frame. In this embodiment, depending leg 276 supports a different scroll retainer 290. Otherwise, the second and third embodiments are identical in structure and mode of operation. The surface of leg 276 facing fork 268 again is relieved to provide a downwardly curved abutment or guide wall 292 for guiding leading end 46 downward to engage scrolling quill 58 and scrolling guide 64, as previously described. The surface of fork 268 facing leg 276 also is relieved to provide a second downwardly curved abutment or guide wall, not illustrated, for the other edge of filmstrip 44. The second abutment is a mirror image of abutment 292. In this embodiment, circularly curved abutment walls 282, 286 on either side of slot 284 of the embodiment of FIGS. 9 and 10 have been replaced by a series of gaps and shorter, circularly curved abutment walls. More specifically, scroll retainer 290 includes an arcuate gap 294 just downstream of abutment 292, a circularly curved abutment wall 296, a pair of arcuate gaps 298, 302 on either side of a radially extending through slot 300, a circularly curved abutment wall 304, an arcuate gap 306, and a circularly curved abutment wall 308. The inside radius of curvature of abutment walls 296, 304, 308 thus determines the maximum permissible diameter D of a scroll. Abutment walls 296, 304 are set at about ninety degrees from each other, symmetrically on either side of slot 300 and each extends over an arc of about forty degrees. Abutment wall 308 extends over an arc of only a few degrees, to allow for an entrance slot 310 located between abutment 292 and abutment wall 308. As shown, abutment wall 308 is located essentially symmetrically with the downstream end of abutment 292; however, this arrangement is not critical. To ease installation into camera frame 110, receiver 118 preferably should be provided with circumferential reliefs, not illustrated, to receive abutment walls 296, 304, 308, thereby allowing the scroll to seat completely in the receiver. Thus, a scroll of maximum diameter could extend into gaps 294, 298, 302, 306 to the inner surface of wall 124 of receiver 118. A protruding member like member 98, 100 may be included to provide further support for a scroll, but is not required to prevent clock-springing. Abutment 292, its mirror image above fork 268, and curved abutment walls 296, 304, 308 thus cooperate to enable scroll retainer 290 to limit outward clock-springing of a scroll when the scrolling quill is withdrawn in the manner previously described. In some cameras, element 128 may not be required; and in such instances, through slot 300 may be omitted.

As shown in FIG. 13, a camera incorporating internal frame 110 may include a front cover portion 320 into which the frame is nested at assembly. In some cameras, cover portion 320 and frame 110 may be formed as a single unit. Frame 110 may include various conventional single-use camera components, such as a taking lens, shutter mechanism, film winding mechanism, and viewfinder housing, none of which is illustrated. A back cover portion 322 also may be included to complete a light-tight housing for the camera.

Figure 14:
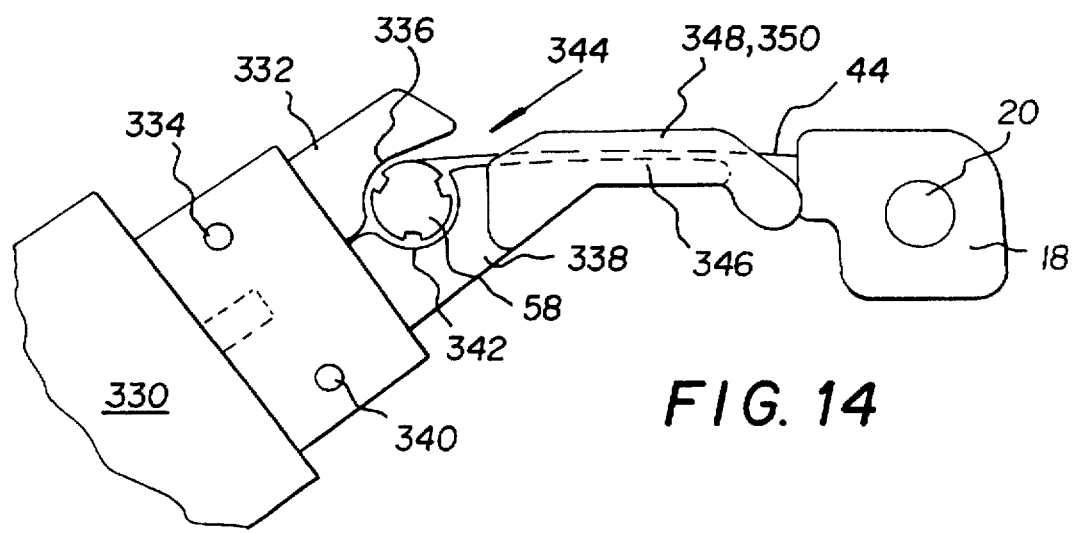
FIG. 14 shows a schematic rear elevation view of an alternative mechanism for cinching a filmstrip onto a scrolling quill.

FIG. 14 illustrates an alternative to scrolling guide shell 64 for use during cinching of the filmstrip to the scrolling quill. A rotary actuator 330 is supported by face plate 12 below the scrolling quill. An upper scrolling guide member or shell 332 is mounted on a pivot 334. Guide member 332 includes a partially cylindrical, elongated recess 336 for closely engaging an upper portion of the scrolling quill. Below guide member 332, a lower scrolling guide member or shell 338 is mounted on a pivot 340. Guide member 338 includes a partially cylindrical, elongated recess 342 for closely engaging a lower portion of the scrolling quill. An entrance slot 344 is defined between outer ends of members 332, 338 in the closed position of FIG. 14. A filmstrip guide track 346 having side walls 348, 350 may be supported by guide member 338 for movement into and out of registration with cartridge 18. As will be understood by those skilled in the art, a conventional gear train may be provided between actuator 330 and guide members 332, 338, for pivoting the guide members. In use, filmstrip 44 is thrust through entrance slot 344 into a clearance space between recesses 336, 342 and the scrolling quill. Improved engagement with the scrolling quill is provided, compared to guide shell 64, due to the increased length of the close clearance space. Once the scroll has begun to build in the manner previously described, actuator 330 is operated to pivot the guide members to an position, not illustrated, for completion of the scrolling.

Figure 15:
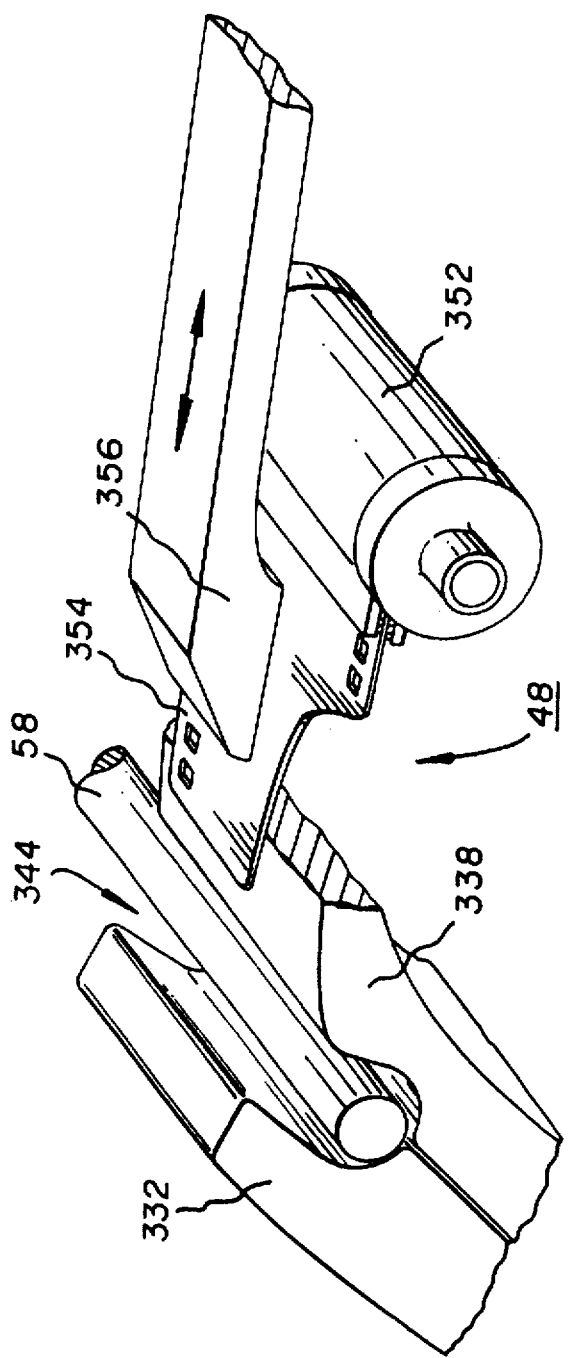
FIG. 15 shows a perspective, partially fragmentary rear view of a mechanism for cinching a leading end of a filmstrip from a conventional 35 mm cartridge.
Figure 16:
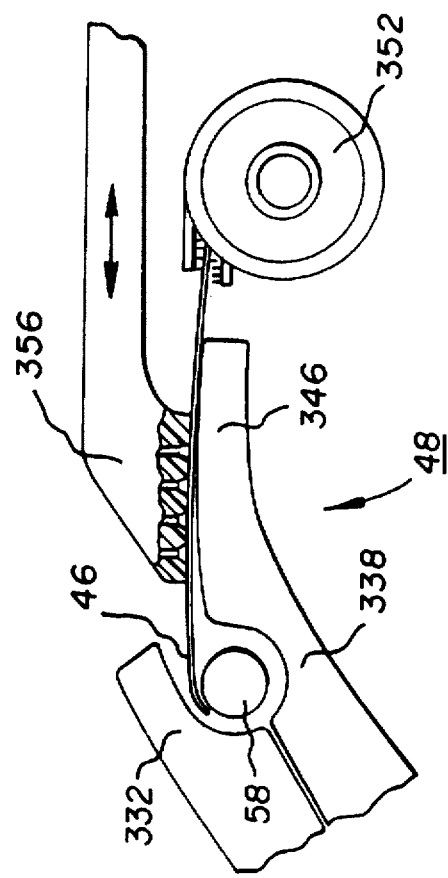
FIG. 16 shows a schematic rear elevation view of the mechanism of FIG. 15 with the leading end inserted into the cinching mechanism.

FIGS. 15 and 16 illustrate an alternative arrangement of scrolling mechanism 48, for use with a conventional 35 mm cartridge 352. In the well-known manner, the filmstrip within such cartridges is provided with a leading end 354 which projects outward from the cartridge through a plush light-lock. The trailing end of the filmstrip is attached to a spool within the cartridge. To engage leading end 354 with scrolling quill 58, a vacuum gripper 356 is provided which can be moved back and forth by a reciprocating mechanism, not illustrated. Thus, a mechanism is provided for moving the leading end from the cartridge. In use, cartridge 352 would be placed in nest 32 in essentially the manner previously described. Gripper 356 would then be engaged with leading end 354 and moved toward the winding quill to pull the filmstrip from the cartridge and to insert the leading end through slot 344. If necessary, gripper 356 could release the leading end, retract, again engage the leading end, and again move toward the winding quill to insert an additional portion of the filmstrip into engagement with the scrolling quill. The apparatus then would complete formation of a scroll and loading of a single-use camera in essentially the same manner as previously described with regard to an APS cartridge.

As previously described, radially extended element 128 is positioned in receiver 118 so that a scrolling quill having a filmstrip wound thereon cannot be completely installed into receiver 118, either axially or radially. Element 128 also would prevent a winding quill from engaging a spool in receiver 118. See FIG. 13, where the radially inner end of element 128 intersects axis 126, along which a scrolling quill or winding quill would have to be located to allow complete installation of a scroll into receiver 118 or rotation of a spool within receiver 118. Thus, a camera having a frame such as frame 110 which includes element 128 could not be loaded or reloaded using the methods of U.S. Pat. No.

4,972,649 which require a scrolling quill to enter the receiver or a winding quill to have access to a spool within the receiver. However, in accordance with a further method of the present invention, element 128 can be completely or partially removed, to enable a winding or scrolling quill to be inserted axially into receiver 118. Preferably, at least a radially inner portion of element 128 would be cut away to allow access by a winding or scrolling quill, thereby leaving a radially outer portion long enough to prevent a scroll from telescoping when a scrolling quill is removed axially from the scroll, or to retain a spool. With element 128 thus shortened or removed entirely, the modified camera frame could be loaded by withdrawing a leading end of a filmstrip from a cartridge, winding the filmstrip onto a scrolling quill to form a scroll, installing the cartridge into receiver 114, installing the scroll into receiver 118, and after installing the scroll, withdrawing the scrolling quill through the open end of receiver 118. The cartridge could be installed in receiver 114 either before or after winding the scroll. If a spool were placed in receiver 118 and the leading end were attached to the spool, a winding quill could be used to rotate the spool within receiver 118.

The invention has been described in detail with particular reference to certain preferred embodiments thereof, but it will be understood that variations and modifications can be effected within the spirit and scope of the invention.

| PARTS LIST | |
|---|---|
| 10 | apparatus for loading a single-use camera |
| 12 | faceplate |
| 14 | back side of 12 in lighted space |
| 16 | front side of 12 in darkened space |
| 18 | light-tight film cartridge |
| 20 | spool within 18 |
| 22 | first transfer arm |
| 24 | vacuum gripper on 22 |
| 26 | keeper plate on 24 |
| 28 | second transfer arm |
| 30 | vacuum gripper on 28 |
| 32 | nest to hold 18 during scrolling |
| 34 | light-lock door opening tool |
| 36 | motor |
| 38 | slide |
| 40 | drive shaft of 36 to engage 20 |
| 42 | track |
| 44 | filmstrip |
| 46 | leading end |
| 48 | scrolling mechanism |
| 50 | splined shaft |
| 52 | linear bearing assembly |
| 54 | lateral arm |
| 56 | scrolling motor |
| 58 | scrolling quill |
| 60 | port for vacuum or pressurized air |
| 62 | stripping hub or nut |
| 64 | scrolling guide member or shell |
| 66 | pivotable arm |
| 68 | shaft |
| 70 | motor |
| 72 | cartridge and scroll gripping mechanism or tool |
| 74 | frame |
| 76 | vacuum gripper for 18 |
| 78 | slide |
| 80 | gripper |
| 82 | frame |
| 84 | fork |
| 86 | central opening to clear 58 |
| 88 | horizontal linear actuator |
| 90 | horizontally movable, |

-continued

| PARTS LIST | |
|---|---|
| | downwardly extended support |
| 92 | scroll retainer |
| 94 | downwardly curved abutment on 92 to guide 46 to 58 and to prevent clock-springing |
| 96 | downwardly curved abutment on 84 to guide 46 to 58 and to prevent clock-springing |
| 98 | protruding member to engage inner diameter of scroll |
| 100 | tapered end of 98 |
| 102 | radially extended through slot |
| 110 | internal camera frame |
| 112 | central exposure opening |
| 114 | receiver or chamber for 18 |
| 116 | open end of 114 |
| 118 | receiver or chamber for scroll |
| 120 | open end of 118 |
| 122 | closed end of 118 |
| 124 | semi-cylindrical wall of 118 |
| 126 | longitudinal axis of 118 |
| 128 | radially extended element |
| 140 | robotically supportable tool for installing 18 and scroll into 110 |
| 142 | L-shaped frame |
| 144 | bottom plate |
| 146 | actuator support |
| 148 | side plate |
| 150 | front side of 146 |
| 152 | vertical linear actuator |
| 154 | actuator rods |
| 156 | gripper support plate |
| 158 | mounting block |
| 160 | horizontal linear actuator |
| 162 | depending leg supporting 92 |
| 164 | depending leg supporting 84 |
| 166 | thin tines to engage scroll end |
| 180 | back side of 146 |
| 182 | vertical linear actuator |
| 184 | actuator rods |
| 186 | stripper support plate |
| 188 | stripper plate |
| 190 | opening in 146 |
| 192 | opening in 144 |
| 194 | vacuum gripper for 18 |
| 196 | horizontal linear actuator |
| 198 | shaft |
| 200 | depending tool support |
| 202 | stub shaft to engage 20 |
| 210 | filmstrip guide track |
| 212,214 | side walls |
| 216,218 | flared inlet portions |
| 220,222 | edge rails |
| 224 | image relief slot |
| 226 | central hollow core |
| 228 | radially extended support lands |
| 230 | grooves between 228 |
| 232 | ports for vacuum or air |
| 234 | scroll |
| 240 | cylindrical body |
| 242,244 | axial extensions |
| 246 | axial bore |
| 248 | radial stripping fingers |
| 250 | circumferential groove |
| 252 | retaining probe |
| 254 | grounded attachment |
| 260 | L-shaped bracket |
| 262 | gripper support plate |
| 264 | mounting block |
| 266 | fixed depending support leg |
| 268 | fork |
| 270 | short tines |
| 272 | central opening to clear 58 |
| 274 | horizontal linear actuator |
| 276 | depending support leg |
| 278 | scroll retainer |
| 280 | downwardly curved abutment on 278 to guide 46 to 58 and to |

PARTS LIST

| | |
|---|---|
| | prevent clock-springing |
| 282 | circularly curved abutment wall |
| 284 | radially extended through slot |
| 286 | circularly curved abutment wall |
| 288 | entrance slot for 44, 46 |
| 290 | scroll retainer |
| 292 | downwardly curved abutment on 290 to guide 46 to 58 and to prevent clock-springing |
| 294 | arcuate gap |
| 296 | circularly curved abutment wall |
| 298 | arcuate gap |
| 300 | radially extended through slot |
| 302 | arcuate gap |
| 304 | circularly curved abutment wall |
| 306 | arcuate gap |
| 308 | circularly curved abutment wall |
| 310 | entrance slot for 44, 46 |
| D | maximum permissible diameter of a scroll |
| 320 | front cover portion |
| 322 | back cover portion |
| 330 | rotary actuator |
| 332 | upper scrolling guide member or shell |
| 334 | pivot for 332 |
| 336 | partially cylindrical recess in 332 |
| 338 | lower scrolling guide member or shell |
| 340 | pivot |
| 342 | partially cylindrical recess in 338 |
| 344 | entrance slot between 332 and 338 |
| 346 | filmstrip guide track |
| 348,350 | side walls of 346 |
| 352 | conventional 35 mm cartridge |
| 354 | leading end extended from 352 |
| 356 | vacuum gripper |

What is claimed is:

1. A method for loading a camera frame for subsequent inclusion in a single-use camera, the camera frame including an exposure opening, a first receiver on one side of the exposure opening for a light-tight film cartridge enclosing a spool to which is attached a trailing end of a filmstrip, and a second receiver on an opposite side of the exposure opening for a scroll formed from the filmstrip, the method comprising steps of:

withdrawing a leading end of the filmstrip from the cartridge;

positioning a scroll retainer near a scrolling quill, the scroll retainer including at least one abutment for engaging an external surface of a scroll to prevent clock-springing of a completed scroll;

winding the leading end around a scrolling quill and into the scroll retainer;

continuing the winding to form the filmstrip into a scroll of film around the scrolling quill, the scroll having an axis and an end of the scroll being within the scroll retainer, while leaving the trailing end attached to the spool within the cartridge;

after winding the scroll, removing the scrolling quill from the scroll;

after removing the scrolling quill, installing both the scroll and the scroll retainer into the second receiver, whereby a portion of the filmstrip extends across the exposure opening between the cartridge and the scroll; and withdrawing the scroll retainer axially from the second receiver to leave the scroll installed in the camera frame.

2. A method according to claim 1, wherein the cartridge is installed into the first receiver after removing the scrolling quill from the scroll.

3. A method according to claim 1, further comprising a step of:

while removing the scrolling quill, gripping the scroll axially to prevent telescoping of the scroll.

4. A method according to claim 1, wherein the scrolling quill applies vacuum to the leading end during winding of the scroll, further comprising steps of:

prior to removing the scrolling quill, releasing the vacuum and applying positive air pressure from the scrolling quill against the scroll; and reversing rotation of the scrolling quill to release the scroll from the quill.

5. A method according to claim 4, further comprising a step of:

while removing the scrolling quill, gripping the scroll axially to prevent telescoping of the scroll.

6. A method according to claim 1, wherein the scroll retainer is positioned near a free end of the scrolling quill.

7. A method according to claim 1, wherein the scroll retainer includes at least one protruding member for engaging an internal diameter of a scroll; and wherein the winding step also includes winding the leading end around the protruding member of the scroll retainer.

8. A method according to claim 7, wherein the scroll retainer is positioned near a free end of the scrolling quill.

9. A method according to claim 7, wherein the cartridge is installed into the first receiver after removing the scrolling quill from the scroll.

10. A method according to claim 7, further comprising a step of:

while removing the scrolling quill, gripping the scroll axially to prevent telescoping of the scroll.

11. A method according to claim 7, wherein the scrolling quill applies vacuum to the leading end during winding of the scroll, further comprising steps of:

prior to removing the scrolling quill, releasing the vacuum and applying positive air pressure from the scrolling quill against the scroll; and reversing rotation of the scrolling quill to release the scroll from the quill.

12. A method according to claim 11, further comprising a step of:

while removing the scrolling quill, gripping the scroll axially to prevent telescoping of the scroll.

13. A method according to claim 1, wherein the cartridge is a thrust cartridge and the withdrawing step comprises thrusting the filmstrip from the cartridge.

14. A method according to claim 1, wherein the withdrawing step comprises pulling the filmstrip from the cartridge.

15. A method of reloading a single-use camera of a type including a camera frame with an exposure opening, a first receiver on one side of the exposure opening for a light-tight film cartridge enclosing a spool to which is attached a trailing end of a filmstrip, a second receiver on an opposite side of the exposure opening for a scroll formed from the filmstrip, the second receiver having at one end a radially extended element for preventing a scrolling quill and a scroll of film on the scrolling quill from being inserted axially into or removed from the second receiver and for preventing a scroll from telescoping axially from the second receiver, the method comprising steps of:

removing at least a radially inner portion of the radially extended element to enable a scrolling quill to be inserted axially into the second receiver;

withdrawing a leading end of a filmstrip from a cartridge;

winding the leading end around a scrolling quill;

installing the cartridge into the first receiver;

installing the scroll into the second receiver; and after installing the scroll, removing the scrolling quill from the scroll through the one end of the second receiver.

16. A method according to claim 15, wherein after the removing step, a radially outer portion of the extended element remains to prevent a scroll from telescoping axially from the second receiver.

17. A method according to claim 15, wherein the cartridge is installed into the first receiver prior to winding the scroll.

18. A method according to claim 15, wherein the scroll is wound outside the second receiver.

19. A method according to claim 15, wherein the scroll is wound within the second receiver.

20. Apparatus for loading a camera frame for subsequent inclusion in a single-use camera, the camera frame including an exposure opening, a first receiver on one side of the exposure opening for a light-tight film cartridge enclosing a spool to which is attached a trailing end of a filmstrip, a second receiver on an opposite side of the exposure opening for a scroll formed from the filmstrip, the second receiver having a longitudinal axis, at least one open end, and a wall extended at least partially around the axis, the apparatus comprising:

a nest for holding a cartridge;

a mechanism for moving a leading end of a filmstrip from a cartridge;

a scroll retainer including at least one abutment for engaging an external surface of a scroll to prevent clock-springing;

a mechanism for positioning the scroll retainer near a scrolling quill;

a scrolling guide for engaging a leading end around a scrolling quill;

a rotatable scrolling quill to wind a scroll;

a mechanism for removing the scrolling quill from a scroll and leaving a scroll engaged with the scroll retainer;

a tool, operable after removal of the scrolling quill from a scroll, for installing a cartridge into the first receiver, and a scroll and the scroll retainer into the second receiver, whereby a portion of a filmstrip will extend across the exposure opening between a cartridge and a scroll; and a mechanism for removing the scroll retainer axially from the second receiver through the at least one open end.

21. Apparatus according to claim 20, wherein the cartridge is a thrust cartridge and the mechanism for moving rotates a spool within the cartridge to thrust a leading end to the scrolling quill.

22. Apparatus according to claim 20, wherein a cartridge has a leading end extended therefrom; and the mechanism for moving pulls the leading end to the scrolling quill.

23. Apparatus according to claim 20, further comprising means for gripping a scroll to prevent telescoping of a scroll during removal of the scrolling quill.

24. Apparatus according to claim 23, further comprising means for stripping a scroll from the means for gripping, whereby a scroll remains in the second receiver.

25. Apparatus according to claim 20, wherein the scrolling quill applies vacuum to a leading end during winding of a scroll, further comprising:

means for releasing the vacuum and applying positive air pressure from the scrolling quill against a scroll; and means for reversing rotation of the scrolling quill to release a scroll from the quill.

26. Apparatus according to claim 25, wherein the tool for installing further comprises:

means for gripping a scroll to prevent telescoping of a scroll during removal of the scrolling quill.

27. Apparatus according to claim 26, wherein the tool for installing further comprises:

means for stripping a scroll from the means for gripping, whereby a scroll remains in the second receiver.

28. Apparatus according to claim 20, wherein the scrolling guide comprises:

a guide for guiding a leading end around the scrolling quill; and means for applying vacuum through the scrolling quill to cinch a leading end thereto.

29. Apparatus according to claim 28, further comprising:

a filmstrip guide track extended from the nest toward the scrolling quill.

30. Apparatus according to claim 28, further comprising a mechanism for moving the scrolling guide away from the scrolling quill after a leading end has become cinched thereto.

31. Apparatus according to claim 20, wherein the scrolling guide comprises:

a pair of guide members pivotably mounted near the scrolling quill, each guide member comprising an elongated recess for partially surrounding the scrolling quill;

an entrance slot between the guide members for receiving a leading end; and means for moving the guide members away from the scrolling quill after a leading end has become cinched thereto.

32. Apparatus according to claim 31, wherein one of the guide members comprises a filmstrip guide track for directing a leading end to the entrance slot.

33. Apparatus according to claim 20, further comprising:

means for applying vacuum to a leading end during winding of a scroll; and the means for removing the scrolling quill comprises:

means for releasing the vacuum; and means for applying positive air pressure from the scrolling quill against a scroll;

means for reversing rotation of the scrolling quill to release a scroll from the quill; and means for withdrawing the scrolling quill from a scroll after the application of positive air pressure and reversal of rotation.

34. Apparatus according to claim 33, wherein the tool for installing comprises:

a frame;

a member supported by the frame for engaging a second, opposite end of a scroll, whereby a scroll may be gripped between the means for engaging and the scroll retainer;

means supported by the frame for holding a cartridge during installing into a camera frame; and means for stripping a scroll from between the means for engaging and the scroll retainer, whereby a scroll remains in the second receiver.

35. Apparatus according to claim 34, further comprising means for retaining a spool within a cartridge against further rotation after completion of a scroll.

36. Apparatus according to claim 34, further comprising means for moving the member for engaging and the scroll retainer toward or away from each other to engage or release the scroll.

37. Apparatus according to claim 20, wherein the scroll retainer comprises a protruding member for engaging an internal diameter of a scroll.

38. Apparatus according to claim 20, wherein the camera frame further includes at the open end of the second receiver, at least one radially extended element for preventing (i) a scrolling quill having a scroll of film wound thereon from being installed axially or radially into the second receiver and (ii) a scroll from telescoping axially from the second receiver; and clearance between the radially extended element and the wall of the second receiver, the clearance being sufficient for axial removal of an installation tool for the scroll; and the scroll retainer comprises a through slot to allow the scroll retainer to move axially past the radially extended element.

39. Apparatus according to claim 38, wherein the scroll retainer comprises a protruding member for engaging an internal diameter of a scroll; and the through slot passes through the protruding member.

40. Apparatus according to claim 20, wherein the scroll retainer comprises a plurality of circularly curved abutment walls for engaging the external surface of the scroll; and an entrance slot into the retainer for the filmstrip.

41. Apparatus according to claim 40, wherein the camera frame further includes at the open end of the second receiver, at least one radially extended element for preventing (i) a scrolling quill having a scroll of film wound thereon from being installed axially or radially into the second receiver and (ii) a scroll from telescoping axially from the second receiver; and clearance between the radially extended element and the wall of the second receiver, the clearance being sufficient for axial removal of an installation tool for the scroll; and the scroll retainer comprises a through slot to allow the scroll retainer to move axially past the radially extended element.

42. Apparatus according to claim 41, wherein the scroll retainer comprises a protruding member for engaging an internal diameter of a scroll; and the through slot passes through the protruding member.

43. A single use camera, comprising:

a camera frame with an exposure opening, a first receiver on one side of the exposure opening for a light-tight film cartridge enclosing a spool to which is attached a trailing end of a filmstrip;

a second receiver on an opposite side of the exposure opening for a scroll formed from the filmstrip, the second receiver having a longitudinal axis, at least one open end, and a wall extended at least partially around the axis;

extended into the open end of the second receiver, at least one radially extended element for preventing (i) a scrolling quill having a scroll of film wound thereon from being installed axially or radially into the second receiver and (ii) a scroll from telescoping axially from the second receiver; and clearance between the radially extended element and the wall of the second receiver, the clearance being sufficient for axial removal of an installation tool for the scroll.

* * * * *